Dec. 28, 1965

A. C. ZEAMER ETAL 3,225,885

CARRIAGE RETURN MECHANISM DRIVEN
BY A TEMPORARILY OVERLOADED
INDUCTION MOTOR

Filed March 25, 1963

INVENTORS
Aaron C. Zeamer
Paul G. Robinson
BY

*Stauch, Nolan Neal*

ATTORNEYS

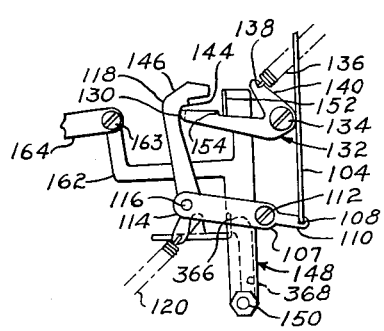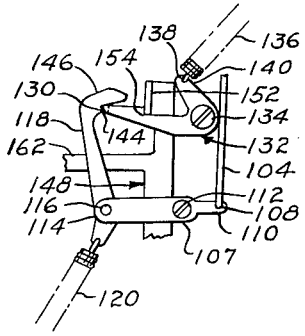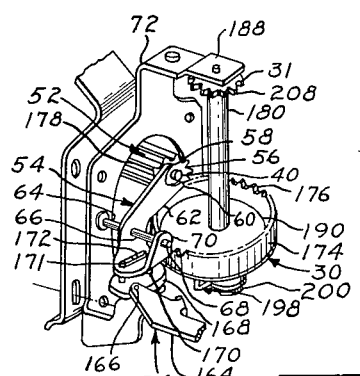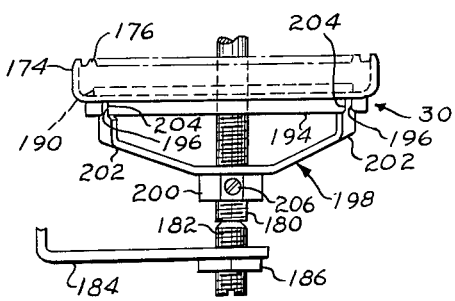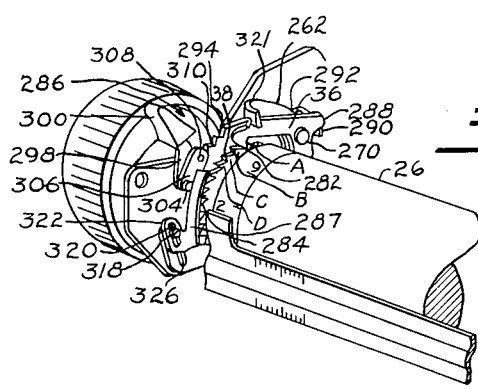

Dec. 28, 1965  A. C. ZEAMER ETAL  3,225,885
CARRIAGE RETURN MECHANISM DRIVEN
BY A TEMPORARILY OVERLOADED
INDUCTION MOTOR
Filed March 25, 1963  4 Sheets-Sheet 3
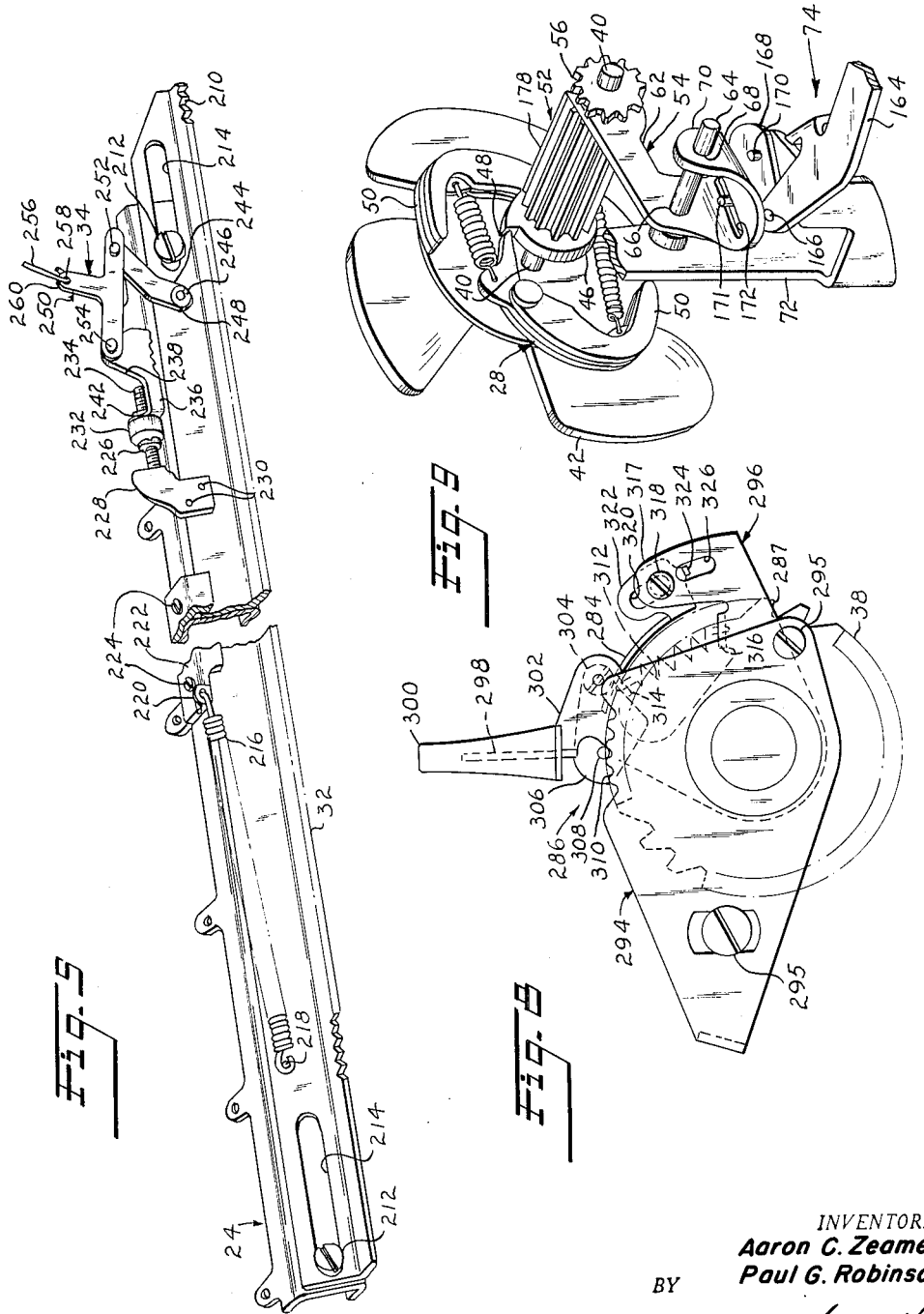
INVENTORS
Aaron C. Zeamer
Paul G. Robinson
BY
Strauch, Nolan & Neale
ATTORNEYS

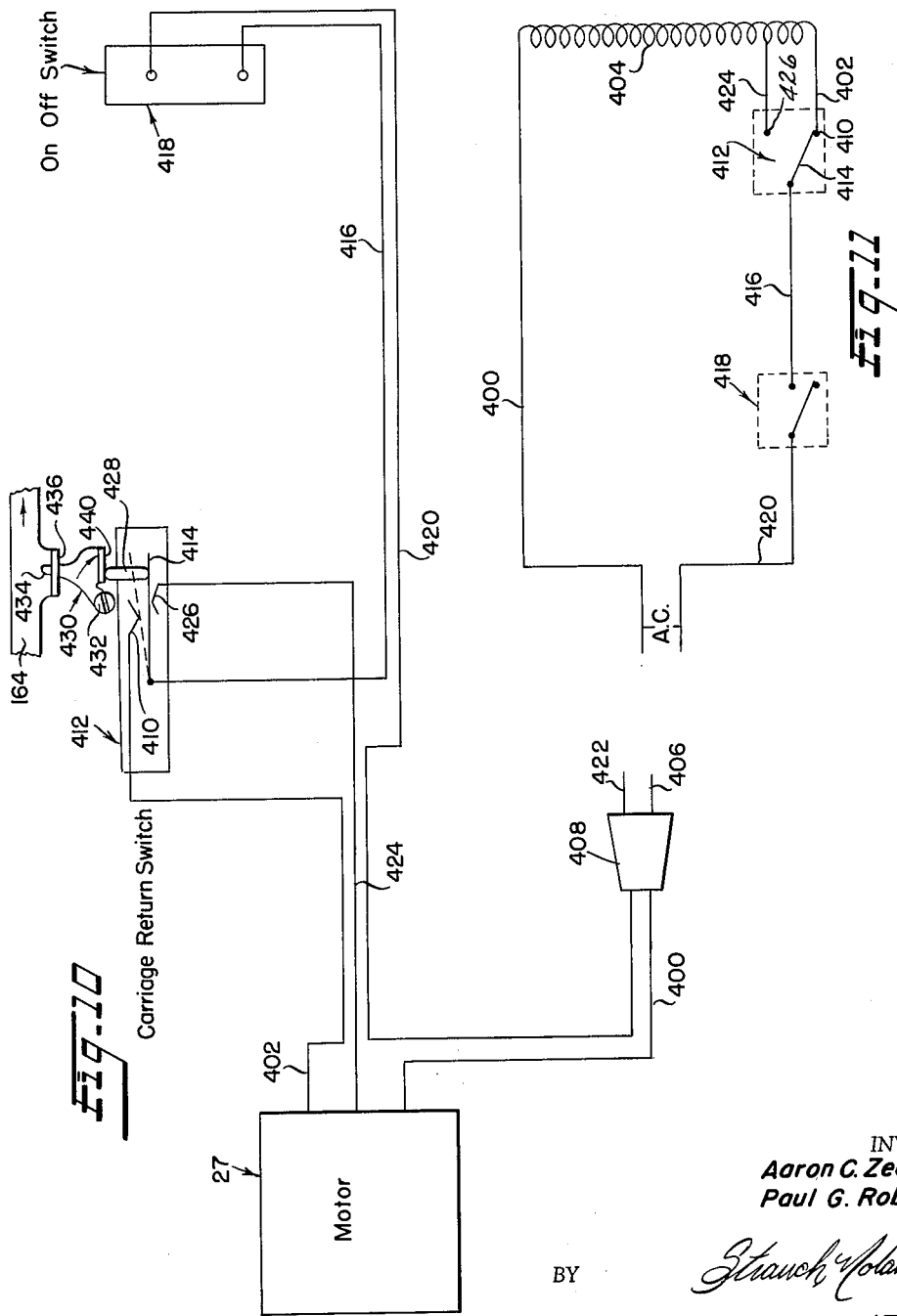

United States Patent Office 3,225,885
Patented Dec. 28, 1965

3,225,885
CARRIAGE RETURN MECHANISM DRIVEN BY A TEMPORARILY OVERLOADED INDUCTION MOTOR
Aaron C. Zeamer, Groton, and Paul G. Robinson, Locke, N.Y., assignors to SCM Corporation, Syracuse, N.Y., a corporation of New York
Filed Mar. 25, 1963, Ser. No. 267,683
1 Claim. (Cl. 197—66)

This invention relates to office machines and, more particularly, to improved power-operated carriage return-linespacing mechanisms for typewriters and the like.

In modern business machines such as typewriters, electric motors are widely employed to operate the typewriter instrumentalities such as the type key levers, to advance the ribbon, and to return and linespace the typewriter carriage. For the majority of these operations very little power is required and, therefore, a small motor is adequate. However, the power needed to overcome the inertia of and return the conventional, relatively heavy typewriter carriage may be several times that required to operate the remaining instrumentalities; and, therefore, a relatively large motor must be provided to serve this one function even though only a small fraction of its power may otherwise be utilized.

In comparison to the size of electric motor adequate to operate the remaining typewriter instrumentalities, a motor sufficiently large for carriage return is relatively bulky and expensive and increases both the size and overall cost of typewriters and similar office machines. It has long been recognized as desirable, therefore, to provide means for making additional power available during carriage return operations to permit the use of a motor which, at its rated load, would be just adequate to operate other typewriter instrumentalities.

One way in which this may be done is by employing a power source including: (a) a small induction motor of a size that will normally produce only the power needed to operate the typewriter instrumentalities; and (b) a selectively activatable circuit that will enable the motor to temporarily develop additional power for the increased loads imposed upon it by the carriage return operations.

Apparatus of this type has heretofore been proposed in United States Patent No. 2,642,976 issued to E. O. Roggenstein June 23, 1953, for "Motor-Driven Carriage Return Mechanism for Business Machines and the Like."

It is one object of the present invention to provide a more reliable and less expensive system of the type disclosed in the above patent.

In conjunction with the foregoing object, another object of the present invention is the provision of a system which is particularly adapted to be employed with and to increase the usefulness of the novel carriage return mechanism disclosed in copending application No. 149,-017 filed October 31, 1961, by Joseph P. Barkdoll for "Carriage Return Mechanism."

Further novel features and other objects of this invention will become apparent from the following detailed description, discussion and the appended claims taken in conjunction with the accompanying drawings showing a preferred structure and embodiment, in which:

FIGURE 2 is a bottom plan view of an actuator latching assembly employed in the carriage return-linespacing mechanism and is taken substantially along line 2—2 of FIGURE 1;

FIGURE 3 is a perspective view of the gear train illustrated in FIGURE 1 showing, in particular, the brackets in which the gears of this train are mounted;

FIGURE 4 is an end view, to an enlarged scale, of the shock absorbing friction clutch employed in the present invention and is taken substantially along line 4—4 of FIGURE 1;

FIGURE 5 is a perspective view of the floating rack employed in the present invention and is taken substantially along line 5—5 of FIGURE 1;

FIGURE 6 is a pictorial view, to an enlarged scale, of the mechanism shown in FIGURE 1 showing the linespacing mechanism in the fully operative position with the pawl engaged in the ratchet wheel teeth;

FIGURE 7 is a view similar to FIGURE 2, but showing the actuator latching mechanism in a position preventing the carriage return-linespacing mechanism from repeating its operating cycle even though the carriage return button is held in a depressed position;

FIGURE 8 is an end view, to an enlarged scale, of the mechanism employed for varying the linespacing and is taken substantially along line 8—8 of FIGURE 1;

FIGURE 9 is a perspective view, to an enlarged scale, of the centrifugal clutch employed in the present invention;

FIGURE 10 is a wiring diagram of the noval carriage return-linespace mechanism power source provided by the present invention and a fragmentary bottom view of the carriage return-linespacing mechanism; and FIGURE 11 is a schematic diagram of the power source of FIGURE 10.

Figure 1:
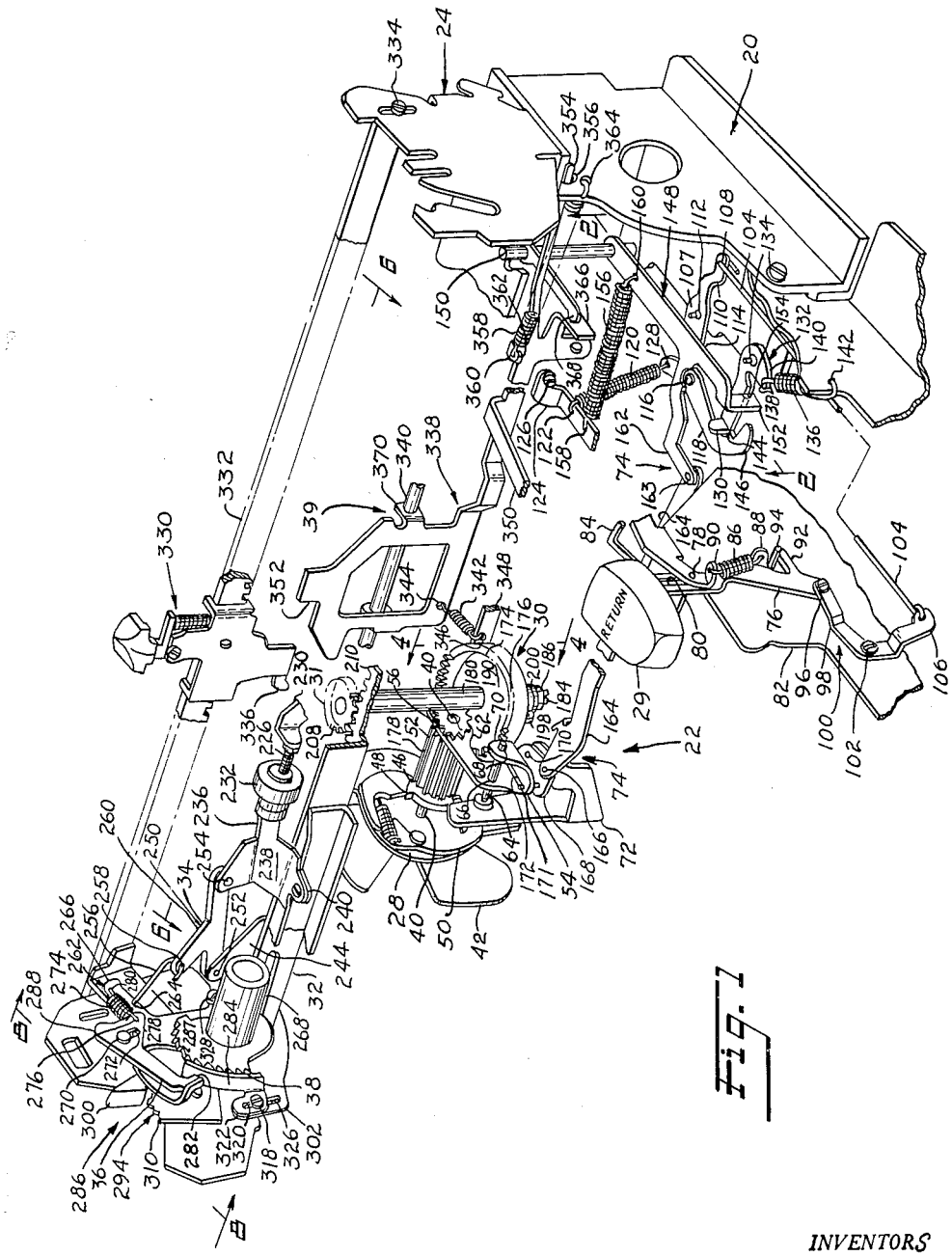
FIGURE 1 is a perspective view of a novel carriage return-linespacing mechanism including a power source constructed in accordance with the principles of the present invention and fragmentary portions of the typewriter frame to which this mechanism is attached.

Referring now to the drawings, FIGURE 1 illustrates a typewriter having a frame indicated generally at 20 on which is mounted a carriage return-linespacing mechanism 22 for returning a carriage 24 to its initial position and simultaneously advancing a platen 26 (see FIGURE 6) mounted on the carriage. Carriage return-linespacing mechanism 22 is operated by power furnished to it from the typewriter motor 27 (see FIGURE 10) through a centrifugal clutch 28 when carriage return button 29 is depressed. The motor power is transmitted, through a friction-type, shock absorbing clutch 30, to a pinion 31 which drives laterally a rack 32 mounted on carriage 24. Depression of carriage return button 29 also activates the novel motor circuit illustrated in FIGURE 10, increasing the power output of motor 27 during the linespacing-carriage return operation.

During an initial, floating portion of its lateral displacement, rack 32 transmits its force through the linespacing mechanism 34 to a pawl 36 which engages a ratchet wheel 38 rotatively fixed to platen 26. During the remainder of its travel, rack 32 pulls carriage 24 to the right to its initial position. When the carriage reaches the initial position, the carriage trips a release mechanism 39 to disconnect carriage return-linespacing mechanism 22 from its source of power. Release mechanism 39 includes a lockout arrangement or linkage which will be explained in detail later and which prevents carriage return-linespacing mechanism 22 from repeating its operating cycle should the operator fail to release carriage return button 29 until after the first cycle of operation has been completed.

Output shaft 40, a continuously rotating power member, of typewriter motor 27 (see FIGURE 10) mounts, for rotation therewith, an air circulating fan 42 for dissipating the heat generated by the motor and is the input means for centrifugal type, positive clutch 28. Rotatably and slidably journalled on the motor output shaft is a sleeve 46 having a pair of oppositely disposed clutch teeth 48 (only one of which is shown) which are adapted to engage the dogs 50 which act as the output means of clutch 28 when sleeve 46 is slid to the left on motor output shaft 40 (see FIGURE 9).

Rotatively fixed to sleeve 46 and also slidable and freely rotatable on motor output shaft 40 is an elongated, preferably nylon spur gear 52. Adjacent the end of gear 52 opposite sleeve 46, the end of an actuator 54 extends into an annular slot 56 milled in gear 52 with actuator prongs 58 and 60 disposed on opposite sides of motor output shaft 40 (see FIGURE 3).

Actuator 54 is bent in a U-shape with the prongs 58 and 60 being located at the end of one leg 62 of the U. The actuator is slidably mounted on a horizontal post 64 which extends through aligned apertures 66 and 68 in actuator legs 62 and 70 and post 64 is, in turn, rigidly attached to a support bracket 72 mounted on any suitable manner on frame 20 of the typewriter. As actuator 54 is moved to the left then, it slides gear 52 and sleeve 46 to the left, engaging clutch teeth 48 with clutch dogs 50 and thereby imparting rotary movement to spur gear 52. Actuator 54 is shifted to the left by an actuator operating linkage 74 which is connected between it and carriage return button 29.

Considering next the nature of linkage 74, carriage return button 29 is mounted for vertical reciprocatory movement on a stem 76 guided by a pin 78 which extends through a vertically elongated slot 80 in stem 76 and is mounted on a bracket 82 that forms part of the typewriter frame 20. Downward movement of button 29 and stem 76 to the operative position is limited by the engagement of a rearwardly and laterally extending L-shaped projection 84 integrally formed on the stem with the upper surface of bracket 82. A spring 86, connected between an ear 88 formed on stem 76 and a lateral extension 90 of bracket 82, biases stem 76 and carriage return button 29 upward to the inoperative position. Upward movement of the stem-mounted button is limited by the engagement of the upper surface of a rearwardly extending projection 92 formed on stem 76 and a pin 94 extending horizontally from bracket 82.

The lower end of stem 76 is pivotally connected by a screw 96 to the end of the rearwardly extending arm 98 of a bell crank 100 which is pivotally mounted on bracket 82 by screw 102. A rearwardly extending pull rod 104 is attached to the end of the second, downwardly extending arm 106 of the bell crank.

Pull rod 104 is also connected, at its rear end, to a pivotally mounted lever 107, the end of the pull rod being hooked in an aperture 108 adjacent the end of a laterally extending lever arm 110. Lever 107 is pivotally mounted on typewriter frame 20 by a screw 112.

Mounted on the left end 114 of lever 107 by a pivot stud 116 is an actuator 118. A spring 120, connected between an aperture 122 in an arm 124 attached to frame 20 by screw 126 and an aperture 128 in the rear end of actuator 118, biases the actuator in a counterclockwise direction. Counterclockwise movement of actuator 118 is limited, when carriage return button 29 is in the inoperative position, by an upwardly extending tab 130 formed on one end of a latch 132.

Latch 132 is pivotally mounted on frame 20 by screw 134 and is biased in a counterclockwise direction by a spring 136 connected between an aperture 138 in latch arm 140 and an aperture 142 in frame 20. When carriage return button 29 is in the inoperative position, latch tab 130 abuts a step 144 formed on an extension 146 of actuator 118 (see FIGURE 2) preventing, as mentioned above, counterclockwise rotation of actuator 118. In these circumstances latch 132 also prevents clockwise rotation of a trigger 148.

Trigger 148 is mounted on and rotatively fixed to a shaft 150 which is pivotally mounted on typewriter frame 20 and which has, at its forward end, a downwardly extending, integral extension 152 which engages a stop surface 154 formed on latch 132 (see also FIGURE 2). A spring 156, connected between an aperture 158 in arm 124 and an aperture 160 formed in trigger 148 adjacent shaft 150, biases trigger 148 in a counterclockwise direction.

Pivotally attached to the end of an L-shaped extension 162 of trigger 148 by a screw 163 is a laterally extending elongated link 164. The other end of link 164 is pivotally connected (see FIGURE 9), by a pivot stud 166, to a rocker 168 which is pivotally mounted on bracket 72 by a screw 170. Rocker 168 mounts a guide pin 171 which extends upwardly through an elongated slot 172 in the actuator 54 which, it will be remembered, shifts teeth 48 of the sleeve 46 attached to gear 52 into engagement with dogs 50 of clutch 28 to cause rotation of the gear.

The operation of the actuator operating linkage 74, described in detail in the preceding paragraphs, is as follows: Depression of carriage return button 29 moves stem 76, on which it is mounted, downwardly, rotating bell crank 100 clockwise about screw 102 and pulling pull rod 104 forwardly. Pull rod 104, moving forwardly, rotates lever 107 clockwise about screw 112. Clockwise rotation of lever 107 moves actuator 118 to the rear, rotating latch 132 in a clockwise direction about screw 134.

As latch 132 rotates, extension 152 of trigger 148 cams off the stop surface 154 of latch 132, allowing spring 156 to rotate trigger 148 clockwise about the axis of shaft 150, moving elongated link 164 to the left.

The movement of link 164 to the left (to the right in FIGURE 10) activates the novel power boosting circuit illustrated in FIGURES 10 and 11, increasing the power output of motor 27 for the carriage return-linespacing operation. Referring now to these figures, the two pole, shaded pole induction motor 27 is adapted to be connected to any convenient A.C. source by leads 400 and 402. Lead 400 is connected directly between one end of the single 735 turn motor winding 404 and prong 406 of plug 408. Lead 402 is connected between the opposite end of winding 404 and the normally closed contact 410 of a two position microswitch 412 of conventional construction. The contactor 414 of microswitch 412 is normally closed against contact 410 and is connected by a lead 416 to one side of an on-off switch 418 which may be of any suitable construction such as that shown in copending application No. 185,408 filed April 5, 1962, by Samuel D. Cappatto et al. for Office Machine. The other side of on-off switch 418 is connected by lead 420 to plug terminal 422.

A third lead 424 is connected to motor winding 404 intermediate its ends, providing on the order of 610 turns between leads 400 and 424. The opposite end of lead 424 is connected to the normally open microswitch contact 426. Thus, when microswitch contactor 414 is transferred from contact 410 (against which it is normally biased) to contact 426, lead 424 is connected to plug terminal 422 through microswitch contact 426, microswitch contactor 414, lead 416, on-off switch 418, and lead 420.

Referring now specifically to FIGURE 10, microswitch contactor 412 is transferred from its normal dotted line position to the full line position to increase the power output of motor 27 during the carriage return linespacing operation by the depression of spring-biased microswitch actuator 428. Depression of actuator 428 is effected by a crank 430 pivotally mounted on an appropriately located, immobile typewriter component (not shown) by a screw or stud 432. Crank arm 434 extends through a slot (not shown) formed in a tab 436 depending from link 164. As link 164 moves to the left (to the right as viewed in FIGURE 10), it rotates crank 430 in a clockwise direction (as shown in FIGURE 10). As the crank rotates, a depending integral crank tab 440 engages and depresses microswitch actuator 428, transferring contactor 414 from contact 410 to contact 426.

With microswitch contactor 414 closed against contact 426, the source voltage is only applied through 610 turns of motor winding 404 rather than 735 turns as in normal operation. This decreases the inductance of and thereby increases the flow of current through the motor winding, increasing its power output for the carriage return-linespacing operation. Although this increased current flow increases the heat generated in the motor winding, the duration of the carriage return-linespacing operation is sufficiently short that the motor will not be overheated even though the carriage return-linespacing operation is repeated at frequent intervals.

Link 164, as it moves to the left, also pivots rocker 168 clockwise about screw 170. Clockwise movement of the guide pin 171 mounted on rocker 168, acting against the side wall of the elongated slot in actuator 54, moves the actuator to the left. Prongs 58 and 60 on actuator 54 (see FIGURE 3) slide gear 52 and sleeve 46 to the left engaging teeth 48 with clutch dogs 50 of clutch 28 which is attached to and rotates with the continuously rotating motor output shaft 40. Since gear 52 is rotatively fixed to sleeve 46, it will, when teeth 48 engage the clutch dogs, rotate at the same rate as motor output shaft 40.

Referring now to FIGURE 4, a preferably nylon crown gear 174 has teeth 176 which are in continuous engagement with the teeth 178 on gear 52. Crown gear 174, which is the input element of friction clutch 30, is mounted on and rotatable about a vertically extending shaft 180 journalled, at its lower end, on a pivot bearing 182 which is threaded into a bracket 184 and secured in place by a nut 186. Bracket 184 is preferably formed as an integral, laterally extending projection on bracket 72 although this arrangement is not critical. The upper end of shaft 180 is journalled in an extension 188 bent laterally from bracket 72.

Rotatively fixed to shaft 180 immediately above crown gear 174 is a disk 190 which comprises an element of friction clutch 30 (see FIGURE 4). Immediately below crown gear 174 on shaft 180 is a disk 194 constituting a second clutch element. Clutch disk 194 is slidable along and rotatable about shaft 180 and has three equidistantly spaced notches 196 formed on its periphery. A spider spring 198, rigidly assembled to a nut 200, has three upwardly extending spring arms 202. Teeth 204, formed on the upper ends of spring arms 202, are seated in the notches 196 in the periphery of disk 194, the teeth being so formed that they do not extend to the upper surface of the disk.

By rotating nut 200 about shaft 180, the bias exerted by spring 198 on clutch disk 194 can be decreased or increased, as desired. In this manner the frictional forces between the hub of the input element, crown gear 174, and the output element, clutch disk 190, can be increased and decreased. A setscrew 206 is threaded into nut 200 and may be tightened against shaft 180 to prevent rotation of the nut-spring-disk assembly with respect to the shaft.

Gear 52, as it rotates, drives crown gear 174 about shaft 180. The frictional force between crown gear 174 and clutch disk 190 (which, it will be remembered, is fixed to shaft 180) causes shaft 180 to rotate. This friction clutch arrangement is a particularly important feature of this invention. Since motor output shaft 40 rotates continuously and since the power-operated components are at rest when they are coupled to it by the engagement of teeth 48 on sleeve 46 and the clutch dogs 50 on centrifugal clutch 28, a severe jerk or shock would be imparted to these components by such engagement if only a positive type clutch were employed between motor output shaft 40 and shaft 180.

Friction clutch 30, which slips at torques above a maximum determined by the position of nut 200, absorbs the shock resulting from the initial engagement of the carriage return-linespacing mechanism and provides a smooth transition of the power-operated components from their rest to operating condition, thereby greatly increasing their useful life.

The pinion 31 which drives rack 32 is fixed to the upper end of shaft 180 and is provided with teeth 208 which engage mating teeth 210 on rack 32. Referring now to FIGURE 5, rack 32 is attached to carriage 24 by a pair of spaced apart screws 212 which extend through laterally extending slots 214 in the rack into threaded engagement with the carriage frame. This permits rack 32, during the initial portion of its carriage return travel, to move laterally without displacing carriage 24 so that its force, during this portion of its travel, may be utilized to operate linespacing mechanism 34.

A spring 216, connected between a spring anchor 218 mounted on rack 32 and an ear 220 formed on a bracket 222 mounted on carriage 24 by screws 224, biases rack 32 to the normal position shown in FIGURE 5. This position is determined by the engagement of a stop screw 226, threaded into a bracket 228 mounted on rack 32 by screws 230, with an adjustable stop 232. Stop 232, which is preferably fashioned from rubber or a similar cushioning material, is rigidly attached to a threaded shank 234 which is threaded into a projection 236 of a bracket 238 attached to the frame of carriage 24 by screw 240. A lock nut 242 is threaded onto shank 234 to maintain stop 232 in the desired position.

The linespacing mechanism 34, operated by rack 32, consists of an arm 244, the lower end of which is pivotally connected to rack 32 by a pivot stud 246 and a retainer 248. An actuator 250 is pivotally connected, at its opposite ends, to the upper end of arm 244 and to the carriage mounted bracket 238 by studs 252 and 254, respectively.

A pull rod 256, operated by actuator 250, is hooked, at one end, in an aperture 258 formed adjacent the end of a transversely extending arm 260 of actuator 250. The opposite end of pull rod 256 is connected to a pawl carrier 262, being hooked into an aperture 264 in a rearwardly directed extension 266 of the latter. Pawl carrier 262 is pivotally mounted on a ratchet bearing 268 to which ratchet wheel 38 and platen 26 are rotatively fixed.

Pawl 36 is mounted on pawl carrier 262 by a pivot stud 270 which extends through an elongated slot 272 formed in the pawl, permitting pivotal and sliding movement of pawl 36 with respect to the carrier. A spring 274, hooked at one end into an aperture 276 formed in extension 278 of pawl 36 and, at the other, into an aperture 280 formed in pawl carrier extension 266, biases pawl 36 downwardly and in a counterclockwise direction.

In the inoperative position of the carriage return-linespacing mechanism 22 (see FIGURE 1), a ratchet-engaging tooth 282, formed on the forward end of pawl 36, rests on the cam 284 of a linespace adjusting mechanism 286 which prevents the tooth from engaging teeth 287 of ratchet wheel 38.

The operation of linespacing mechanism 34 is as follows: When carriage return button 29 is depressed, the typewriter motor output shaft is, in the manner described above, connected to shaft 180 causing rotation of pinion 31. Rotation of pinion 31, in turn, causes rack 32 to move to the right from the inoperative position of FIGURE 5. During the initial portion of the stroke, it will be remembered, carriage 24 does not move since the screws 212 mounting the carriage to rack 32 slide freely in slots 214 formed in the rack.

As the rack moves to the right, it causes arm 244 to rotate actuator 250 in a counterclockwise direction (looking from the front toward the rear of the typewriter) about pivot stud 254. Actuator 250, rotating counterclockwise, pulls pull rod 256 downwardly, thus rotating pawl carrier 262 clockwise about ratchet bearing 268. As pawl carrier 262 rotates, pawl 36 moves off the rear end of cam 284 whereupon spring 274 will bias the tooth 282 of pawl 36 into engagement with a tooth 287 of ratchet wheel 38.

Because of the force required to rotate ratchet wheel 38 and platen 26, pawl tooth 282 will remain engaged with tooth 287 and pawl carrier 262 will continue to rotate, spring 274 meanwhile pulling the rear end of pawl 36 down until stud 270 bottoms in the top end of the slot 272 formed in the pawl. At this point (see FIGURE 6) a L-shaped extension 321 of pawl carrier 262 is positioned over the forward, tooth-bearing end of pawl 36, preventing pawl tooth 282 from moving out of engagement with ratchet wheel tooth 287. Subsequent clockwise rotation of pawl carrier 262, caused by the sliding movement of rack 32, will, acting through pawl 36, rotate ratchet wheel 38 clockwise, advancing platen 26. The linespacing portion of the carriage return-linespacing operating cycle is terminated when the heel 288 (see FIGURE 6) of pawl 36 engages extension 290 of a bracket 292 rigidly mounted on the frame of carriage 24 in any suitable manner. Thereafter rotary movement of pawl 36 will be prevented for the remainder of the operating cycle.

Pawl 36, it will now be apparent, moves through a fixed stroke (from the position of FIGURE 1 to the position where pawl heel 288 engages extension 290 of bracket 292) in the line spacing cycle. However, it is desirable to provide an adjustment for varying the angle through which pawl 36 rotates platen 26 so that the machine may be set for single space, double space, triple space, and perhaps other multi-space operation. This objective is accomplished, in the present invention, by the linespace adjusting mechanism 286 referred to above.

Linespace adjusting mechanism 286, which is best shown in FIGURE 8, comprises an adjuster plate 294 which surrounds ratchet bearing 268 and is secured to the frame of carriage 24 by screws 295. Journalled on ratchet bearing 268 immediately adjacent adjuster plate 294 is an adjuster 296 provided, at its upper end, with an extension 298 on which is mounted a linespace adjusting lever 300. Pivotally mounted on adjuster 296 on a forwardly directed extension 302 below lever 300 by a pivot stud 304 is a detent arm 306. At its rear end, detent arm 306 mounts a horizontally extending pin 308 which is adapted to rest in one of a series of equidistantly spaced grooves 310 formed in the upper surface of adjuster plate 294. Pin 308 is normally maintained in the selected groove 310 by a spring 312 which is connected between an extension 314 of detent arm 306 and an extension 316 of adjuster 296 and biases detent arm 306 in a counterclockwise direction.

The cam 284, referred to above, which, in the inoperative position maintains pawl 36 out of engagement with the teeth 287 of ratchet wheel 38 is adjustably mounted on an upwardly directed integral extension 317 of the forward end of adjuster 296 by a screw 318 extending through an elongated slot 320 formed in an extension 322 of the cam and a projection 324 formed on the cam which extends through an elongated slot 326 in adjuster 396 and prevents cam 284 from rotating on screw 318.

The linespacing of the machine is selected by moving adjusting lever 300 forward (or backward). This rotates adjuster 296 clockwise about ratchet bearing 268 causing the pin 308 mounted on detent arm 306 to ride up out of the groove 310 in which it is then located, detent arm 306, at this point, rotating clockwise against the bias of spring 312. As adjuster 296 moves further, spring 312 rotates detent arm 306 counterclockwise moving pin 308 into the adjacent groove 310. Pin 308 will then retain adjuster 296 in this new angularly displaced position.

As adjuster 296 rotates, it carries cam 284 with it. The effect of cam 284 upon the linespacing of the typewriter can perhaps best be understood by the following example: Referring to FIGURE 6, it will be assumed that, when pawl 36 rides off cam 284 and engages tooth "A," the machine is set for single space operation. That is, as is conventional, the pitch of tooth A and the other teeth 287 is such that, if the platen 26 is rotated through an angle whereby teeth 287 travel through an arc equal to their pitch, the paper or other material engaged by the platen will advance one line, there normally being six lines per inch. And the stroke of pawl 36 is such that, when it engages tooth "A" in its operating cycle, platen 26 will be rotated through the above-described angle.

Since the teeth 287 are equally spaced about the periphery of ratchet wheel 38, if pawl 36 engages tooth "B" instead of tooth "A" when tooth 282 rides off the end of cam 284, the platen will be advanced twice as far as when it engaged tooth "A" inasmuch as the stroke of pawl 36 will be doubled. Therefore, when the adjusting lever 300 is set to the single space position, cam 284 will cover tooth "B" and pawl 36 will engage tooth "A." When the lever 300 is moved to the double space position, however, tooth "B" will be uncovered and will be engaged by pawl 36 to double the angular advance of the platen. For increased spacing, cam 284 may be moved to positions where succeeding teeth such as "C" and "D" will be uncovered, thereby successively lengthening the stroke of pawl 36 and multiplying the advance of platen 26.

The grooves 310 on adjuster plate 294 are dimensioned so that when pin 308 is moved from one groove to the adjoining groove, cam 284 will move through a distance such that it uncovers (or covers) one tooth 287. A scale (not illustrated) bearing a serially numbered index may be disposed adjacent lever 300 so that when the operator moves the lever opposite the number "2" on the scale, for example, pin 308 will be in the groove wherein tooth "B" will be uncovered and tooth "C" will be covered, whereby the machine will be set for double space operation.

Substantially concurrently with the termination of the linespacing portion of the operating cycle of the carriage return linespacing mechanism, the screws 212 attaching rack 32 to the frame of carriage 24 will engage the end of the slots 214 formed in the rack. Thereafter, as rack 32 moves to the right (looking from the front of the typewriter towards its rear), it will carry carriage 24 to the right, returning it to its initial position. This carriage returning movement is terminated by the triggering of release mechanism 39, next to be described.

Release mechanism 39 may be triggered by a stop screw 328 attached to the left hand end of the frame of carriage 24 or by margin stop 330. Margin stop 330, which may be of conventional construction, is mounted on a rack 332 attached to the frame of carriage 24 by screws 334 (only one of which is shown) in parallel relation to rack 32. Therefore, margin stop 330, like stop screw 328, will move to the right together with carriage 24.

In the ensuing discussion it will be assumed that release mechanism 39 is triggered by the extension 336 formed on the lower end of margin stop 330, but it is to be understood that the operation of the release mechanism is substantially the same when it is triggered by stop screw 328. That is, if margin stop 330 is adjusted to the extreme left of rack 332, carriage 24 will travel to the right until stop screw 328 triggers release mechanism 39 which will then operate in the same manner as if triggered by margin stop 330.

Release mechanism 39 comprises a release bracket 338 pivotally and slidably mounted on a rod 340 rigidly mounted on typewriter frame 20 by suitable support brackets (not shown) in parallel relation to rack 332. Bracket 338 is biased in a clockwise direction (looking from the right side of the machine toward the left) by a spring 342 hooked in an aperture 344 adjacent to the lower edge of bracket 338 and in an aperture 346 formed in a bracket 348 mounted on typewriter frame 20.

Bracket 338 is maintained in a substantially vertical position by the abutment of an extension 350 on release bracket 338 with the underside of the carriage bed frame (not shown). In this position, an upwardly directed extension 352 of bracket 338 lies in the path of travel of extension 336 of margin stop 330 as the stop moves from left to right with carriage 24.

A laterally directed extension 354 of bracket 338 extends through an aperture 356 in typewriter frame 20 at the right hand side of the machine, allowing bracket 338 to move to the right when engaged by margin stop 330. A spring 358, hooked into an aperture 360 in a tab 362 bent laterally from the top surface of lateral bracket extension 354 and an aperture 364 in typewriter frame 20, biases release bracket 338 to the right, engaging a tab 366 bent out from bracket extension 354 with the free end of an arm 368 rotatively fixed, at its opposite end, to shaft 150.

The operation of release mechanism 39 is as follows: When carriage return button 29 is released immediately after triggering the carriage return-linespacing mechanism 22, spring 86 biases the button mounting stem 76 upwardly until the extension 92 on the stem engages pin 94. Upward movement of stem 76 rotates bell crank 100 counterclockwise about screw 102, pushing pull rod 104 toward the rear of the typewriter.

Referring next to FIGURE 2, as pull rod 104 moves to the rear, it rotates lever 107 clockwise about screw 112. When trigger 148 is subsequently restored to its latched inoperative position, spring 120 will bias actuator 118 clockwise about stud 116 to its inoperative position (FIGURES 1 and 2).

Then as carriage 24, moving to the right, nears its initial position, extension 336 on stop 330 engages extension 352 on release bracket 338, sliding the release bracket to the right and rotating arm 368 and shaft 150 in a counterclockwise direction. The movement of bracket 338 is terminated by the engagement of an extension 370 formed on bracket 338 with the bracket (not shown) referred to above which supports rod 340 from the typewriter frame 20. This causes trigger 148, which is rotatively fixed to shaft 150, to also rotate in a counterclockwise direction, pulling link 164 to the right. Link 164, moving to the right, rotates rocker 168 clockwise which moves actuator 54 to the right. This moves gear 52 and sleeve 46 to the right, disengaging clutch teeth 48 from the clutch dogs 50 of centrifugal clutch 28. As link 164 moves to the right (to the left in FIGURE 10), it also rotates microswitch actuating crank 430 in a counterclockwise direction (as shown in FIGURE 10), permitting actuator 428 to return to its normal position to transfer contactor 414 from contact 426 to contact 410. The operating voltage is consequently applied across all 735 turns of motor winding 404, decreasing the power output of motor 27 to its normal level.

Looking next to FIGURE 2, at the time that the carriage return-linespacing mechanism 22 is disengaged from centrifugal clutch 28, trigger 148 will have been rotated by release mechanism 39, acting through shaft 150, to a point where extension 152 of trigger 148 will be located to the right of stop surface 154 on latch 132. Spring 136 will then rotate latch 132 clockwise about screw 134 until it contacts the edge of trigger extension 152. Carriage 24 will settle slightly to the left, allowing spring 156 (see FIGURE 1), which is much heavier than spring 358, to, acting through arm 368, side release bracket 338 to the left on rod 340, restoring it to its inoperative position, and rotate trigger 148 counterclockwise until trigger extension 152 abuts stop surface 154 of latch 132. This restores trigger 148 to the inoperative position shown in FIGURE 1.

Looking next to FIGURE 1, when teeth 48 on sleeve 46 are disengaged from the dogs 50 of clutch 28, rack 32 is biased to the left by spring 216 (see FIGURE 5) until stop screw 226 mounted on the rack engages the stop 232 mounted on the frame of carriage 24. This return movement of rack 32 causes arm 244 of linespacing mechanism 34 to rotate in a clockwise direction about stud 246, thereby rotating actuator 250 in a clockwise direction about stud 254 to the inoperative position of FIGURE 1.

Movement of actuator 250 forces pull rod 256 upwardly, rotating pawl carrier 262 counterclockwise about ratchet bearing 268. This movement first relaxes the tension of spring 274, allowing pawl 36 to move downwardly until stud 270 is located in the upper end of slot 272 in pawl 36, then disengages tooth 282 of pawl 36 from tooth 287 of ratchet wheel 38, and, finally, returns pawl 36 to the inoperative position of FIGURE 1.

At this point all of the elements described above will have been restored to the inoperative positions shown in FIGURE 1 and the carriage return-linespacing mechanism 22 will be prepared for a subsequent cycle of operation.

In the event that carriage return button 29 is held depressed until the carriage return-linespacing cycle is completed, trigger 148 will, in the manner described in the preceding paragraphs, be restored to its inoperative position. However, as is shown in FIGURE 7, actuator 118 will, by the continued depression of carriage return button 29, be maintained in its operative position.

In this position, stop 144 of actuator 118 is biased by spring 120 against extension 152 of trigger 148, preventing spring 156 from rotating trigger 148 to the operative position and thereby causing the carriage return-linespacing mechanism 22 to repeat its cycle. When carriage return button 29 is subsequently released, actuator 118 will, in the manner described above, be rotated clockwise about stud 116 by spring 120. This will cause tab 130 on latch 132 to ride up over the stop 144 formed on actuator 118, returning latch 132 to the inoperative position shown in FIGURES 1 and 2.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

An office machine, comprising:
(a) a movable carriage;
(b) a carriage return mechanism therefor;
(c) a variable powered induction motor;
(d) a continuously unidirectionally rotating power member operatively connected to said motor;
(e) a sleeve having clutch teeth formed thereon mounted on said power member and rotatable relative to said power member;
(f) a centrifugal clutch having an output means adapted to be operatively engaged by said sleeve and an input means connected to said power member;
(g) a spur gear operatively connected to the output means of said centrifugal clutch;
(h) a friction clutch having input means and output means, said friction clutch input means being operatively connectable to said spur gear;
(i) means operatively connected between the output means of said friction clutch and said carriage for advancing said carriage to its initial position, said last named means being actuated solely by said friction clutch output;
(j) a pair of leads connected to the opposite ends of the winding of said induction motor and adapted to be connected to a source of alternating current;
(k) a tap lead connected to said winding at a point intermediate its ends and adapted to be connected to said source of alternating current;

(l) a switch means for interrupting the continuity of one of said end-connected leads and simultaneously establishing continuity in said tap lead; and (m) actuator means for simultaneously operatively engaging said sleeve with the output means of said centrifugal clutch and said spur gear with the input means of said friction clutch and for actuating said switch means to connect said winding to said source of alternating current through said tap lead, thereby simultaneously increasing the power output of said motor and initiating the operation cycle of the carriage return mechanism.

References Cited by the Examiner

UNITED STATES PATENTS

| | | | |
|---|---|---|---|
| 938,801 | 11/1909 | Trejo | 197—66 |
| 1,914,705 | 6/1933 | Thompson | 197—66 |
| 1,943,431 | 1/1934 | Gorin | 197—66 |
| 2,028,747 | 1/1936 | Horton et al. | 197—66 X |
| 2,206,308 | 7/1940 | Schwich | 318—225 X |
| 2,244,443 | 6/1941 | Bradey | 197—66 |
| 2,266,088 | 12/1941 | Shea | 318—225 |
| 2,379,941 | 7/1945 | Walker et al. | 197—66 |
| 2,508,143 | 5/1950 | Burdett | 318—225 |
| 2,642,976 | 6/1953 | Roggenstein | 107—66 |
| 2,797,788 | 7/1957 | Blodgett | 197—66 |
| 2,864,986 | 12/1958 | Hutchins et al. | 318—225 |

ROBERT E. PULFREY, *Primary Examiner.*

EUGENE R. CAPOZIO, *Examiner.*